US012664673B2

(12) United States Patent
Wang et al.

(10) Patent No.: US 12,664,673 B2
(45) Date of Patent: Jun. 23, 2026

(54) BEACH EROSION DETECTION AND QUANTITATIVE CALCULATION METHOD BASED ON UNMANNED AERIAL VEHICLE MAPPING

(71) Applicant: FIRST INSTITUTE OF OCEANOGRAPHY, MINISTRY OF NATURAL RESOURCES, Qingdao (CN)

(72) Inventors: Yongzhi Wang, Qingdao (CN); Changle Zhang, Qingdao (CN); Jun Du, Qingdao (CN); Yi Zhong, Qingdao (CN); Xiaolong Zhao, Qingdao (CN)

(73) Assignee: First Institute of Oceanography, Ministry of Natural Resources, Qingdao (CN)

( * ) Notice: Subject to any disclaimer, the term of this patent is extended or adjusted under 35 U.S.C. 154(b) by 0 days.

(21) Appl. No.: 19/092,635

(22) Filed: Mar. 27, 2025

(65) Prior Publication Data

US 2025/0378566 A1 Dec. 11, 2025

(30) Foreign Application Priority Data

Jun. 11, 2024 (CN) .......................... 202410745872.4

(51) Int. Cl.
  *G06T 7/55* (2017.01)
  *G01C 21/16* (2006.01)
  (Continued)

(52) U.S. Cl.
  CPC ............... *G06T 7/55* (2017.01); *G01C 21/16* (2013.01); *G06T 5/60* (2024.01); *G06T 5/70* (2024.01);
  (Continued)

(58) Field of Classification Search
  CPC .. G06V 10/7715; G06V 10/82; G06V 10/751; G06V 10/30; G06V 10/776;
  (Continued)

(56) References Cited

U.S. PATENT DOCUMENTS

| | | | |
|---|---|---|---|
| 7,461,998 B1 | 12/2008 | Parnell et al. | |
| 12,165,500 B2 | 12/2024 | Li et al. | |
| 2020/0311842 A1 | 10/2020 | Li et al. | |

FOREIGN PATENT DOCUMENTS

| | | |
|---|---|---|
| CN | 111473818 A | 7/2020 |
| CN | 112444234 A | 3/2021 |

(Continued)

OTHER PUBLICATIONS

Tak, W. J., et al. "Using drone and LiDAR to assess coastal erosion and shoreline change due to the construction of coastal structures." Journal of Coastal Research 95.SI (2020): 674-678. (Year: 2020).*

(Continued)

*Primary Examiner* — Tracy Mangialaschi
(74) *Attorney, Agent, or Firm* — Pilloff Passino & Cosenza LLP; Rachel Pilloff; Sean Passino

(57) ABSTRACT

A beach erosion detection and quantitative calculation method based on unmanned aerial vehicle mapping is provided, including the following steps: S1, configuring unmanned aerial vehicles; S2, obtaining beach aerial image data in different periods by using the unmanned aerial vehicle; S3, delineating a plurality of sections on the beach, and extracting elevation data of the sections from the multi-period data by using the aerial images processed; S4, in order to unify the reference boundary of multi-period aerial photography data, a unified lowest water line is defined, and the upper boundary is the coastline; S5, automatically identifying and predicting factors affecting beach erosion; S6, performing real-time erosion prediction and future erosion trend simulation; S7, calculating the total (Continued)

amount of beach erosion, and comparing the sand amount in each grid to get the distribution characteristics of beach erosion change.

8 Claims, 2 Drawing Sheets

(51) Int. Cl.

| | |
|---|---|
| *G06T 5/60* | (2024.01) |
| *G06T 5/70* | (2024.01) |
| *G06T 5/73* | (2024.01) |
| *G06T 7/00* | (2017.01) |
| *G06T 7/13* | (2017.01) |
| *G06V 10/30* | (2022.01) |
| *G06V 10/75* | (2022.01) |
| *G06V 10/764* | (2022.01) |
| *G06V 10/77* | (2022.01) |
| *G06V 10/776* | (2022.01) |
| *G06V 10/82* | (2022.01) |
| *G06V 20/17* | (2022.01) |
| *G06V 20/70* | (2022.01) |

(52) U.S. Cl.

CPC .............. *G06T 5/73* (2024.01); *G06T 7/0002* (2013.01); *G06T 7/13* (2017.01); *G06V 10/30* (2022.01); *G06V 10/751* (2022.01); *G06V 10/764* (2022.01); *G06V 10/7715* (2022.01); *G06V 10/776* (2022.01); *G06V 10/82* (2022.01); *G06V 20/17* (2022.01); *G06V 20/70* (2022.01); *G06T 2207/10024* (2013.01); *G06T 2207/10028* (2013.01); *G06T 2207/10032* (2013.01); *G06T 2207/20021* (2013.01); *G06T 2207/20081* (2013.01); *G06T 2207/20084* (2013.01); *G06T 2207/30184* (2013.01); *G06T 2207/30188* (2013.01); *G06T 2207/30196* (2013.01); *G06T 2207/30204* (2013.01)

(58) Field of Classification Search

CPC ...... G06V 10/764; G06V 20/17; G06V 20/70; G06T 7/55; G06T 7/13; G06T 7/0002; G06T 5/73; G06T 5/60; G06T 5/70; G06T 2207/10024; G06T 2207/10028; G06T 2207/10032; G06T 2207/20021; G06T 2207/20081; G06T 2207/20084; G06T 2207/30184; G06T 2207/30188; G06T 2207/30196; G06T 2207/30204; G01C 21/16

See application file for complete search history.

(56) References Cited

FOREIGN PATENT DOCUMENTS

| | | | |
|---|---|---|---|
| CN | 115439748 | A | 12/2022 |
| CN | 116136893 | A | 5/2023 |
| CN | 117423002 | A | 1/2024 |
| CN | 117670821 | A | 3/2024 |
| KR | 20210077390 | A | 6/2021 |

OTHER PUBLICATIONS

Abdurrahman, Umar, et al. "Beach slope distribution mapping using UAV in the Cirebon coastal area." E3S Web of Conferences. vol. 324. EDP Sciences, 2021. (Year: 2021).*

Young, Stephen S., Steven Rao, and Kayla Dorey. "Monitoring the erosion and accretion of a human-built living shoreline with drone technology." Environmental Challenges 5 (2021): 100383. (Year: 2021).*

Retrieval report—First search dated Jul. 11, 2024 in SIPO application No. 202410745872.4.

Notice of first Office action dated Jul. 12, 2024 in SIPO application No. 202410745872.4.

Retrieval report—Supplementary search dated Jul. 22, 2024 in SIPO application No. 202410745872.4.

Notification to Grant Patent Right for Invention dated Jul. 23, 2024 in SIPO application No. 202410745872.4.

Liu Yong, et al., Coastal erosion and its cause analysis in different spatial temporal scales based on multi sources data in Dongshan Island of Fujian Province, Haiyang Xuebao, Mar. 15, 2016, vol. 38., No. 3, pp. 98-110 (abstract last page) doi: 10.3969/j.issn.0253-4193. 2016.03.010 Full text; Claims involved: 1-10.

* cited by examiner

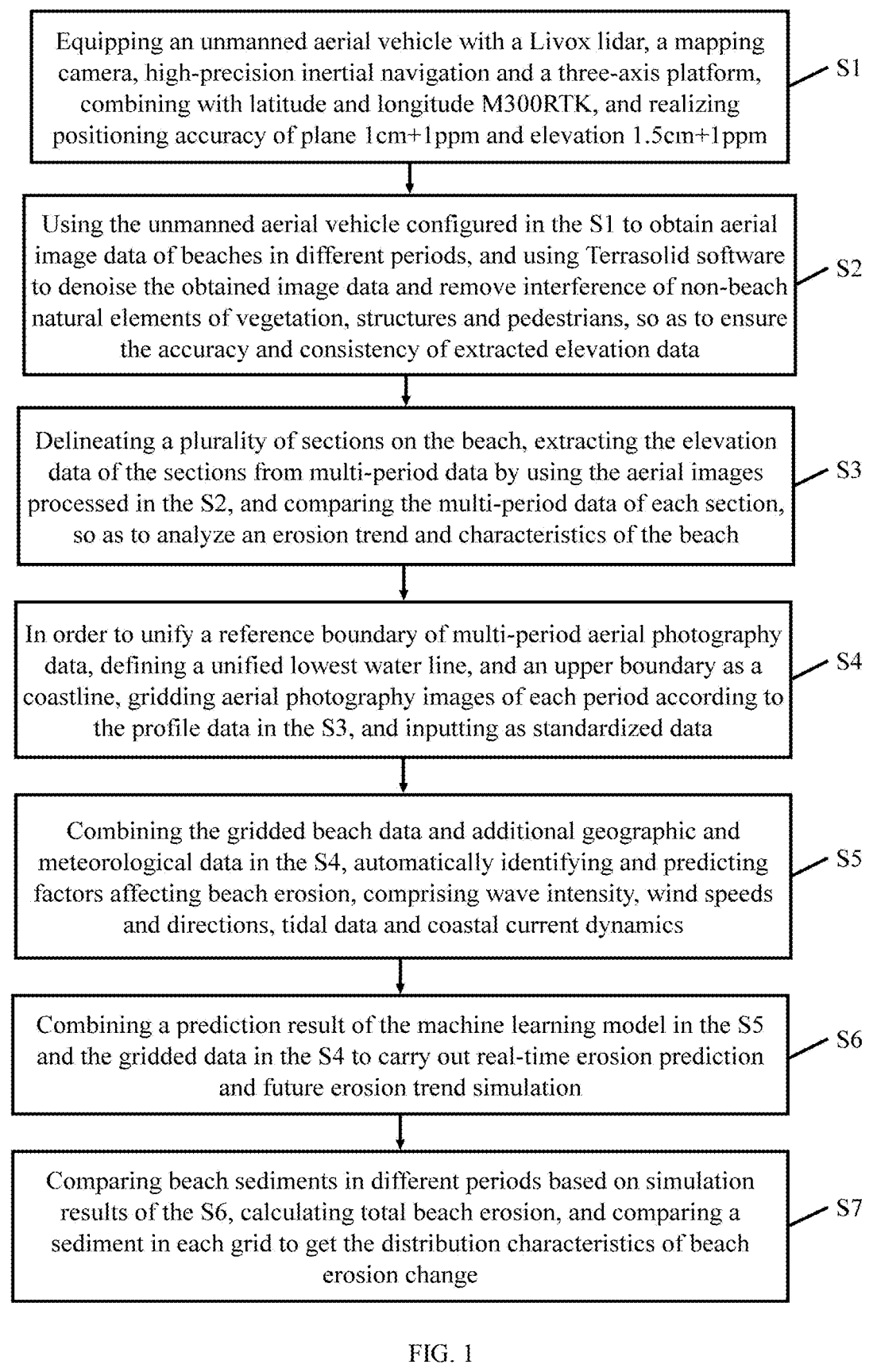

Equipping an unmanned aerial vehicle with a Livox lidar, a mapping camera, high-precision inertial navigation and a three-axis platform, combining with latitude and longitude M300RTK, and realizing positioning accuracy of plane 1cm+1ppm and elevation 1.5cm+1ppm — S1

Using the unmanned aerial vehicle configured in the S1 to obtain aerial image data of beaches in different periods, and using Terrasolid software to denoise the obtained image data and remove interference of non-beach natural elements of vegetation, structures and pedestrians, so as to ensure the accuracy and consistency of extracted elevation data — S2

Delineating a plurality of sections on the beach, extracting the elevation data of the sections from multi-period data by using the aerial images processed in the S2, and comparing the multi-period data of each section, so as to analyze an erosion trend and characteristics of the beach — S3

In order to unify a reference boundary of multi-period aerial photography data, defining a unified lowest water line, and an upper boundary as a coastline, gridding aerial photography images of each period according to the profile data in the S3, and inputting as standardized data — S4

Combining the gridded beach data and additional geographic and meteorological data in the S4, automatically identifying and predicting factors affecting beach erosion, comprising wave intensity, wind speeds and directions, tidal data and coastal current dynamics — S5

Combining a prediction result of the machine learning model in the S5 and the gridded data in the S4 to carry out real-time erosion prediction and future erosion trend simulation — S6

Comparing beach sediments in different periods based on simulation results of the S6, calculating total beach erosion, and comparing a sediment in each grid to get the distribution characteristics of beach erosion change — S7

FIG. 1

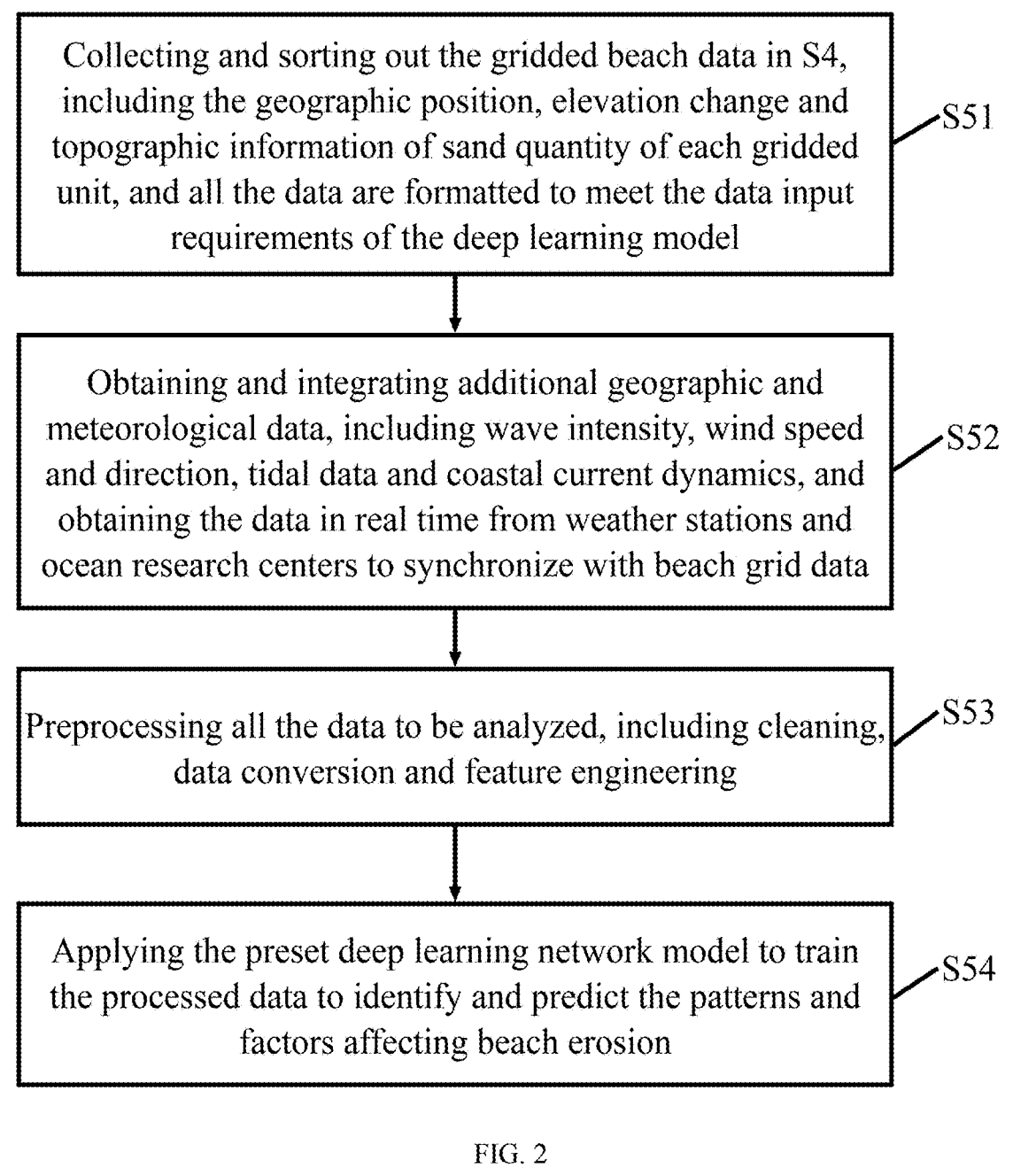

Collecting and sorting out the gridded beach data in S4, including the geographic position, elevation change and topographic information of sand quantity of each gridded unit, and all the data are formatted to meet the data input requirements of the deep learning model    ⟋S51

Obtaining and integrating additional geographic and meteorological data, including wave intensity, wind speed and direction, tidal data and coastal current dynamics, and obtaining the data in real time from weather stations and ocean research centers to synchronize with beach grid data    ⟋S52

Preprocessing all the data to be analyzed, including cleaning, data conversion and feature engineering    ⟋S53

Applying the preset deep learning network model to train the processed data to identify and predict the patterns and factors affecting beach erosion    ⟋S54

FIG. 2

BEACH EROSION DETECTION AND QUANTITATIVE CALCULATION METHOD BASED ON UNMANNED AERIAL VEHICLE MAPPING

CROSS-REFERENCE TO RELATED APPLICATIONS

This application claims priority to Chinese Patent Application No. 202410745872.4, filed on Jun. 11, 2024, the contents of which are hereby incorporated by reference.

TECHNICAL FIELD

The application relates to the technical field of beach erosion detection, in particular to a beach erosion detection and quantitative calculation method based on unmanned aerial vehicle mapping.

BACKGROUND

With people's increasing concern about the environmental protection of the coastline, the demand for beach erosion monitoring and management has become increasingly urgent. The conventional beach erosion monitoring method usually relies on ground measurement and manual sampling, which has some problems such as high costs, low efficiency and insufficient data acquisition, which limits the in-depth understanding of beach changes.

In the field of beach environmental protection, it is a complex and challenging task to accurately monitor and evaluate beach erosion, and the existing technology is usually limited by the following problems: first, it is difficult to obtain data, as conventional methods rely on ground measurement or manual sampling, which is costly and requires a lot of work; second, the data processing is complicated and the beach environment is complex and changeable, so it is difficult for conventional methods to accurately extract and analyze the beach topography and sedimentation; third, it is difficult to carry out in a real-time manner, and the conventional methods often need a lot of time and manpower, which may not reflect the beach change trend in time.

Therefore, it is necessary to develop a new beach erosion monitoring and management method to solve the problems faced by the existing technology.

SUMMARY

Based on the above purpose, the disclosure provides a beach erosion detection and quantitative calculation method based on unmanned aerial vehicle mapping.

A beach erosion detection and quantitative calculation method based on unmanned aerial vehicle mapping includes the following steps:

S1, unmanned aerial vehicle equipped with Livox LIDAR, mapping camera, high-precision inertial navigation and three-axis platform, combined with latitude and longitude M300RTK, realizes the positioning accuracy of plane 1 cm+1 ppm and elevation 1.5 cm+1 ppm;

S2, using the unmanned aerial vehicle configured in S1 to obtain aerial image data of beaches in different periods, and using TerraSolid software to denoise the obtained image data and remove the interference of non-beach natural elements of vegetation, structures and pedestrians, so as to ensure accuracy and consistency of the extracted elevation data;

S3, delineating a plurality of sections on the beach, extracting the elevation data of the sections from the multi-period data by using the aerial images processed in S2, and comparing the multi-period data of each section, so as to analyze the erosion trend and characteristics of the beach;

S4, in order to unify the reference boundary of multi-period aerial photography data, defining a unified lowest water line with an upper boundary as a coastline, gridding the aerial photography images of each period according to the profile data in S3, and inputting as standardized data;

S5, automatically identifying and predicting factors affecting beach erosion with consideration to the gridded beach data and additional geographic and meteorological data in S4, including wave intensity, wind speed and direction, tidal data and coastal current dynamics;

S6, combining a prediction result of the machine learning model in the S5 and the gridded data in the S4 to carry out real-time erosion prediction and future erosion trend simulation; and S7, comparing the beach sand amount in different periods by the simulation results of the S6, calculating total beach erosion, and comparing the sand amount in each grid to get distribution characteristics of beach erosion change.

Further, the S1 specifically includes:

S11, selecting an unmanned aerial vehicle equipped with a Livox LIDAR, where the LIDAR is able to measure the distance between the target and the unmanned aerial vehicle and the relative position of the target by emitting laser pulses and receiving their reflected signals, so as to obtain high-resolution terrain data;

S12, configuring a high-resolution mapping camera on the unmanned aerial vehicle, where the mapping camera has high dynamic range and fast imaging capability, and is used for capturing high-definition images of the ground and providing visual reference for terrain data;

S13, configuring a high-precision inertial navigation system on the unmanned aerial vehicle, and the accelerometer and gyroscope are used to monitor the movement state and attitude change of the unmanned aerial vehicle to ensure the stability in the flight process, and at the same time, the system is used to provide time stamp and spatial position information to support the accurate alignment of LIDAR and camera data;

S14, installing a three-axis pan/tilt platform on the unmanned aerial vehicle, where the three-axis pan/tilt platform is used to control the angles of the LIDAR and the mapping camera and aim at the measurement area, so as to reduce errors in data acquisition and improve the adaptability to complex terrain;

S15, integrating the UAV with the longitude and latitude M300 RTK system, and using RTK for high-precision positioning calibration, M300 RTK is able to correct the position of UAV through real-time communication with ground base stations or satellite signals, and realizes the plane positioning accuracy of 1 cm+1 ppm and the elevation positioning accuracy of 1.5 cm+1 ppm.

Further, the S2 specifically includes:

S21, configuring the UAV in S1 to carry out regular flight tasks, and flying to the same beach area at predetermined time intervals to obtain aerial image data in different periods, and ensuring the flight plan is carried out under the same weather conditions and sunshine angles, so as to reduce data differences caused by environmental factors;

S22, capturing the image data of the beach ground with the high-precision mapping camera on the UAV, and recording the specific parameters of each flight, including altitude, speed and GPS coordinates, so as to ensure the spatial consistency and repeatability of the image data;

S23, firstly, subjecting the collected image data to preliminary denoising processing, specifically using the Qualcomm filtering technology in an image processing software to remove the image blur caused by camera vibration or wind speed change, so as to improve the image clarity;

S24, importing the processed image data into TerraSolid software, and using an automatic classification tool in the software to identify and label the non-beach natural elements of vegetation, structures and pedestrians in the image, the automatic classification tool is based on machine learning algorithm and accurately distinguishes various elements by analyzing the characteristics of color, texture and shape of the image;

S25, applying the ground point filtering function of TerraSolid software to remove data points marked as unnatural beach elements, including vegetation and the top of structures, and only the real ground elevation points are kept;

S26, performing spatial interpolation on the remaining beach natural elevation data to fill the data vacancy caused by removing unnatural elements, and the kriging interpolation method is specifically used to ensure the consistency and accuracy of interpolation.

Further, the S3 specifically includes:

S31, delineating a plurality of fixed profile lines on the beach by using a geographic information system, where the profile lines are arranged at predetermined intervals and directions to cover different geomorphological features and tidal influence areas;

S32, after each scheduled flight mission, according to the high-precision aerial image data processed in S2 step, automatically aligning and matching to the preset profile line through the geographic information system, so as to ensure the accurate alignment of each image with geographical markers and to provide a solid foundation for historical data comparison;

S33, applying the digital elevation model extraction tool to extract the ground elevation data on each section line from the aligned aerial images, and generating a continuous section elevation map by analyzing the geographical position and corresponding elevation value of each pixel;

S34, storing and managing multi-period profile elevation data in a preset database, establishing an index for each period of data, and maintaining the time sequence and retrievability of the data;

S35, comparing the profile elevation data of each period, performing differential analysis by using data analysis software, quantifying the elevation change between the data of each period, and calculating the historical erosion or deposition rate and total amount of each section through analysis, so as to reveal the long-term erosion trend;

S36, according to the analysis result of S35, drawing a trend map and an erosion hotspot map to visually show the historical erosion trend and characteristics of each section, and clearly showing the erosion degree and changing trend of the beach in the past period of time by color coding and graphic marking.

Further, the S35 specifically includes:

S351, firstly, loading the multi-period profile elevation data stored in S34 into the data analysis software to ensure that all the data are organized and synchronized according to the same profile line and the same time series, so as to provide an accurate data base for subsequent analysis;

S352, comparing the profile elevation data between two consecutive periods by differential analysis technology, and identifying the elevation change by calculating the elevation difference between data points of two adjacent periods. The differential analysis calculation formula is as follows: $\Delta H_{t,\ t+1}(x) = H_{t+1}(x) - H_t(x)$, where the $\Delta H_{t,\ t+1}(x)$ is an elevation variation of position x between time t and t+1, and the $H_t(x)$ and the $H_{t+1}(x)$ are the elevation values of position x at time t and t+1, respectively;

S353, statistically analyzing the difference results of each profile, and calculating the average erosion or deposition rate of each profile, specifically, calculating the average value based on all the difference results to estimate the overall erosion or deposition of the profile line, the calculation formula of erosion or deposition $$R(x) = \frac{1}{N-1} \sum\nolimits_{t=1}^{N-1} \Delta H_{t,t+1}(x),$$

where the R(x) represents the erosion or deposition rate at the site; the $\Delta H_{t,\ t+1}(x)$ is the elevation change of position x between time t and t+1; N represents the total number of measurement cycles; t represents a predetermined measurement time point, and t and t+1 represent two consecutive measurement periods;

S354, calculating total amount of erosion or deposition of each profile, the total amount is the cumulative sum of elevation changes in all time periods, and is used to reflect the long-term trend and shows the overall elevation changes of the profile from the first measurement to the last measurement.

Further, the S4 specifically includes:

S41, before each aerial photography data is processed, firstly, determining the reference boundary of the beach, and determining the tidal level during each aerial photography by analyzing the tidal data, so as to set the lowest waterline of each image, the lowest waterline is used as a unified reference boundary to ensure the consistency of all image data in the vertical direction;

S42, setting the coastline as the upper boundary of each period aerial image, and automatically identify and mark the coastline position by using the feature recognition technology in the geographic information system, including analyzing the terrain and vegetation distribution layers, so as to accurately define the coastline position;

S43, according to the profile data defined in S3, gridding the each period aerial images, and dividing each profile area into 12-meter grid units through a preset gridding algorithm to ensure the accurate correspondence and consistency of each grid unit in space;

S44, standardizing the gridded data, including normalizing the elevation data to the same standard sea level.

Further, the S5 specifically includes:

S51, collecting and sorting out the gridded beach data in S4, including the geographic position, elevation change and topographic information of sand amount of each gridded unit, and all the data are formatted to meet the data input requirements of the deep learning model;

S52, obtaining and integrating additional geographic and meteorological data, including wave intensity, wind speed and direction, tidal data and coastal current dynamics, and obtaining the data in real time from weather stations and ocean research centers to synchronize with beach grid data;

S53, preprocessing all the data to be analyzed, including cleaning, data conversion and feature engineering;

S54, applying the preset deep learning network model to train the processed data to identify and predict the patterns and factors affecting beach erosion.

Further, the S54 specifically includes:

S541, firstly, configuring the architecture of the deep learning network model, selecting a network structure suitable for processing geographical and meteorological data, specifically convolutional neural network or cyclic neural network, to process spatial data and time series data, and setting the parameters of each layer of the network, including the number of layers, the number of neurons and the activation function;

S542, dividing the preprocessed data set in S53, according to the proportion of 70% training set, 20% verification set and 10% test set, the training set is used for model training, the verification set is used for adjusting model parameters and preventing over-fitting, and the test set is used for evaluating the final performance of the model;

S543, using the training set to train the deep learning model, specifically applying a back propagation algorithm and a gradient descent method to adjust network weight, minimizing an error between a predicted output and the actual data, and setting predetermined learning rates and iteration times to achieve best training effects, wherein formulas of the back propagation and gradient descent are:

$$W_{new} = W_{old} - \alpha \frac{\partial L}{\partial W},$$

wherein, $W_{new}$ and $W_{old}$ are weights before and after updating, a is a learning rate, L is a loss function, and $$\frac{\partial L}{\partial W}$$

is a gradient of the loss function about the weight;

S544, monitoring the performance of the model by using the verification set in the training process, and improving the prediction ability of the model for unknown data by adjusting the learning rate and layer number of network parameters, and terminating the training by applying the early stop technique, and the training is stopped when the error of the verification set starts to increase to prevent over-fitting;

S545, using the trained model to evaluate the test set data, verifying the accuracy and generalization ability of the model, and identifying the factors that have the greatest impact on beach erosion by analyzing the feature importance of the model output.

Further, the S6 specifically includes:

S61, firstly, obtaining a prediction result from S5, including the prediction value of erosion influencing factors of each grid unit, and using the prediction result to reflect the potential influencing factors and intensity of future erosion;

S62, combining the beach data gridded in S4 with the prediction results, and using data fusion technology, integrating the terrain and environmental data of each grid unit with the predicted erosion factors to form a comprehensive data set, so as to provide a more comprehensive perspective for erosion prediction;

S63, using the dynamic system model to analyze and simulate the erosion trend of the integrated data set, where the dynamic system model considers the change trend of time series data and the interaction of environmental factors to predict the future erosion mode and rate, and the formula of the dynamic system model is:

$$\frac{dE}{dt} = f(E, I_t),$$

where $$\frac{dE}{dt}$$

represents the change of erosion rate, E is the current erosion state, and It is the influencing factor of time t;

S64, using the calculated erosion rate and pattern, combining with historical erosion data, updating the erosion state of each grid unit, specifically using geographic information system technology, spatializing the predicted data, and displaying the future erosion trend and potential danger areas in the form of graphs and maps;

S65, regularly updating the erosion prediction model and simulation parameters, and making adjustments according to the newly obtained real-time monitoring data and environmental changes to ensure the accuracy and adaptability of the model prediction.

Further, the S7 specifically includes:

S71, obtaining an erosion rate and predicted future erosion trend of each grid unit from S6, and integrating the rate and trend with historical sand amount data, so as to provide a basis for comparing multi-period beach sand amount;

S72, calculating the sand amount of each grid unit at different time points, and the sand amount of each grid unit is calculated by the following formula: $S_t = S_{t-1} + \Delta E_t \times A$, where, $S_t$ is the sand amount amount at time t, $S_{t-1}$ is the sand amount amount in the previous time point, $\Delta E_t$ is the erosion rate at the time obtained from S6, and A is the grid area;

S73, comparing the grid sand amount data at different time points, calculating the total erosion of the beach, and getting the total erosion of the whole beach by accumulating the changes of sand amount in all grid units, the calculation formula of the total erosion of the beach is as follows:

$$\text{Total\_rosion} = \sum_{i=1}^{N} (S_{start,i} - S_{end,i}),$$

where, Total_rosion is the total amount of beach erosion, in volume (cubic meters), $S_{start,i}$ and $S_{end,i}$ are the sand amount at the beginning and end of monitoring in grid i, and N is the total number of grids;

S74, analyzing the erosion data of each grid unit, identifying the hot spots and areas with less erosion, and using data visualization tools, including heat map and erosion distribution map, to show the spatial distribution characteristics of beach erosion change.

The disclosure has the beneficial effects that:

The disclosure realizes high-precision positioning of the beach and acquisition of aerial image data by adopting a UAV equipped with a LIDAR, a mapping camera and other equipment, and compared with traditional ground surveying, the method has the advantages of fast data acquisition speed and low cost, and is capable of efficiently obtaining beach topography and sand volume data.

Based on the extracted beach elevation data and aerial images, combined with a digital elevation model and a machine learning model, the disclosure is able to realize accurate analysis and prediction of beach erosion trends and characteristics, provide reliable erosion amount change distribution characteristics by simulating real-time erosion prediction and future erosion trends, and help to formulate beach protection and management measures in time.

The disclosure is able to provide scientific data support and management decision-making for beach environmental protection, and through comprehensively monitoring the beach erosion process, it promotes the in-depth understanding of the change of coastline environment, is helpful to formulate effective protection policies and measures, and protects the sustainable development of beach ecological environment.

BRIEF DESCRIPTION OF THE DRAWINGS

In order to explain the technical scheme of the present disclosure or the prior art more clearly, the drawings needed to be used in the description of the embodiment or the prior art will be briefly introduced below. Obviously, the drawings in the following description are only the present disclosure, and other drawings are able to be obtained according to these drawings without creative work for ordinary people in the field.

FIG. 1 is a schematic diagram of a beach erosion detection and quantitative calculation method according to an embodiment of the present disclosure.

FIG. 2 is a schematic flow chart for identifying and predicting factors affecting beach erosion according to an embodiment of the present disclosure.

DETAILED DESCRIPTION OF THE EMBODIMENTS

In order to make the purpose, technical scheme and advantages of the present disclosure more clear, the present disclosure will be further described in detail with specific examples.

It should be noted that, unless otherwise defined, technical terms or scientific terms used in the present disclosure should have their ordinary meanings as understood by people with ordinary skills in the field to which the present disclosure belongs. The terms "first", "second" and the like used in the present disclosure do not indicate any order, quantity or importance, but are only used to distinguish different components. Similar words such as "including" or "containing" mean that the elements or objects appearing before the word cover the elements or objects listed after the word and their equivalents, without excluding other elements or objects.

As shown in FIGS. 1-2, A beach erosion detection and quantitative calculation method based on unmanned aerial vehicle mapping, the method includes the following steps:

S1, equipping an unmanned aerial vehicle with Livox LIDAR, a mapping camera, high-precision inertial navigation and a three-axis pan/tilt, combining with latitude and longitude M300 RTK (Real-time dynamic technology), realizing the positioning accuracy of plane 1 cm+1 ppm and elevation 1.5 cm+1 ppm, so as to ensure the high-precision acquisition of data;

S2, using the unmanned aerial vehicle configured in S1 to obtain aerial image data of beaches in different periods, and using TerraSolid software to denoise the obtained image data and remove the interference of non-beach natural elements of vegetation, structures and pedestrians, so as to ensure accuracy and consistency of the extracted elevation data;

S3, delineating a plurality of sections on the beach, extracting the elevation data of the sections from the multi-period data by using the aerial images processed in S2, and comparing the multi-period data of each section, so as to analyze the erosion trend and characteristics of the beach;

S4, in order to unify the reference boundary of multiperiod aerial photography data, defining a unified lowest water line, and an upper boundary is a coastline, and the aerial photography images of each period are gridded according to the profile data in S3, and inputted as standardized data;

S5, combining the gridded beach data and additional geographic and meteorological data in S4, automatically identifying and predicting factors affecting beach erosion, including wave intensity, wind speed and direction, tidal data and coastal current dynamics;

S6, combining the prediction result of the machine learning model in S5 and the gridded data in S4 to carry out real-time erosion prediction and future erosion trend simulation;

S7, comparing the beach sand amount in different periods by the simulation results of S6, calculating the total beach erosion, and comparing the sand amount in each grid to get the distribution characteristics of beach erosion change.

The S1 specifically includes:

S11, selecting an unmanned aerial vehicle equipped with a Livox LIDAR, where the LIDAR is able to measure the distance between the target and the unmanned aerial vehicle and the relative position of the target by emitting laser pulses and receiving their reflected signals, so as to obtain high-resolution terrain data;

S12, configuring a high-resolution mapping camera on the unmanned aerial vehicle, where the mapping camera has high dynamic range and fast imaging capability, and is used for capturing high-definition images of the ground and providing visual reference for terrain data, enhancing the accuracy of subsequent data fusion;

S13, configuring a high-precision inertial navigation system on the unmanned aerial vehicle, and the accelerometer and gyroscope are used to monitor the movement state and attitude change of the unmanned aerial vehicle to ensure the stability in the flight process, and at the same time, the system is used to provide time stamp and spatial position information to support the accurate alignment of LIDAR and camera data;

S14, installing a three-axis pan/tilt on the unmanned aerial vehicle, where the three-axis pan/tilt is used to control the angles of the LIDAR and the mapping camera and aim at the measurement area, so as to reduce errors in data acquisition and improve the adaptability to complex terrain;

S15, integrating the UAV with the longitude and latitude M300 RTK system, and using RTK (Real-time dynamic technology) for high-precision positioning calibration, M300 RTK is able to correct the position of UAV through real-time communication with ground base stations or satellite signals, and realizes the plane positioning accuracy of 1 cm+1 ppm and the elevation positioning accuracy of 1.5 cm+1 ppm; through the configuration and implementation of the above detailed steps, the UAV system is able to obtain real-time and accurate beach topography and geomorphology data in flight, which will provide a reliable basis for subsequent erosion monitoring and analysis, and ensure the efficiency and accuracy of the whole beach erosion detection and quantitative calculation method.

The S2 specifically includes:

S21, configuring the UAV in S1 to carry out regular flight tasks, and flying to the same beach area at predetermined time intervals (Such as once a quarter) to obtain aerial image data in different periods, and ensuring the flight plan is carried out under the same weather conditions and sunshine angles, so as to reduce data differences caused by environmental factors;

S22, capturing the image data of the beach ground with the high-precision mapping camera on the UAV, and recording the specific parameters of each flight, including altitude, speed and GPS coordinates, so as to ensure the spatial consistency and repeatability of the image data;

S23: firstly, subjecting the collected image data to preliminary denoising processing, specifically using the Qualcomm filtering technology in an image processing software to remove the image blur caused by camera vibration or wind speed change, so as to improve image clarity;

S24, importing the processed image data into TerraSolid software, and using an automatic classification tool in the software to identify and label the non-beach natural elements of vegetation, structures and pedestrians in the image, the automatic classification tool is based on machine learning algorithm and accurately distinguishes various elements by analyzing the characteristics of color, texture and shape of the image.

S25, applying the ground point filtering function of TerraSolid software to remove data points marked as unnatural beach elements, including vegetation and the top of structures, and only the real ground elevation points are kept, this step is carried out by setting filtering parameters, such as height threshold, to ensure that only data points related to ground elevation are extracted;

S26, performing spatial interpolation on the remaining beach natural elevation data to fill the data vacancy caused by removing unnatural elements, and kriging interpolation method is specifically used to ensure the consistency and accuracy of interpolation;

through the above steps, it is able to be ensured that the comparison of the obtained beach aerial image data in different periods is highly accurate and consistent, which provides reliable data support for the monitoring and evaluation of beach erosion.

The S3 specifically includes:

S31, delineating a plurality of fixed profile lines on the beach by using a geographic information system (GIS), where the profile lines are arranged at predetermined intervals and directions to cover different geomorphological features and tidal influence areas, the lines aim at comprehensively capturing and reflecting the erosion state of the beach;

S32, after each scheduled flight mission, according to the high-precision aerial image data processed in S2 step, automatically align and match to the preset profile line through the geographic information system, so as to ensure the accurate alignment of each image with geographical markers and provide a solid foundation for historical data comparison;

S33, applying the digital elevation model (DEM) extraction tool to extract the ground elevation data on each section line from the aligned aerial images, and generating a continuous section elevation map by analyzing the geographical position and corresponding elevation value of each pixel;

the S33 specifically includes:

S331, firstly, ensuring that each period aerial image is accurately aligned to the preset section line through the automatic alignment function of GIS software in step S32, and in the alignment process, using a coordinate conversion algorithm to convert the geographic coordinate system of the image into the same coordinate system as the section line to ensure the accurate matching of the geographic position of each pixel, and the formula of the coordinate conversion algorithm is $X'=aX+bY+c$; $Y'=dX+eY+f$, where the sum of X, Y is the original coordinates, $X'$ and $Y'$ are the converted coordinates, and a, b, c, d, e, f is the conversion parameter determined according to the geographical coordinate system;

S332, using digital elevation model (DEM) extraction tool to extract the ground elevation data from the aligned image, the tool uses the spectral information and terrain shadow characteristics of the image to calculate the elevation value of each pixel through an elevation inversion algorithm, the formula of the elevation inversion algorithm is:

$$H = H_0 + \frac{(I - I_0)}{K},$$

where H is the calculated elevation value, $H_0$ is the reference elevation, I is the brightness value of the current pixel, $I_0$ is the reference brightness, and K is the proportional coefficient from brightness change to elevation change;

S333, using interpolation tools in the geographic information system to generate a continuous profile elevation map based on the elevation point data extracted in S332. In this interpolation process, Kriging interpolation method is used to predict the elevation values of unknown points according to the elevation values of known points around to generate a continuous elevation surface; through the application of the above detailed steps and algorithm formulas, the ground elevation data of each profile line is able to be accurately extracted from the aerial images, and high-precision continuous profile elevation maps may be generated, which provide strong support for analyzing the erosion trend and characteristics of beaches;

S34, storing and managing multi-period profile elevation data in a preset database, establishing an index for each period of data, and maintaining the time sequence and retrievability of the data, the database provides key data support for understanding the beach erosion in the past period of time;

S35, comparing the profile elevation data of each period, performing differential analysis by using data analysis software, quantifying the elevation change between the data of each period, and calculating the historical erosion or deposition rate and total amount of each section through analysis, so as to reveal the long-term erosion trend;

S36, according to the analysis result of S35, drawing a trend map and an erosion hotspot map to visually show the historical erosion trend and characteristics of each section, and clearly showing the erosion degree and changing trend of the beach in the past period of time by color coding and graphic marking, it is convenient for managers and researchers to interpret and make decisions;

through the implementation of the above steps, this method is able to not only accurately monitor and evaluate the beach erosion, but also effectively record and analyze the beach erosion history in the past period, providing scientific basis for beach management and protection measures.

The S35 specifically includes:

S351, firstly, loading the multi-period profile elevation data stored in S34 into the data analysis software to ensure that all the data are organized and synchronized according to the same profile line and the same time series, so as to provide an accurate data base for subsequent analysis;

S352, comparing the profile elevation data between two consecutive periods by differential analysis technology, and identifying the elevation change by calculating the elevation difference between data points of two adjacent periods.

The differential analysis calculation formula is as follows:

$\Delta H_{t, t+1}(x) = H_{t+1}(x) - H_t(x)$, where the $\Delta H_{t,t+1}(x)$ is a elevation variation of position x between time t and t+1, and the $H_t(x)$ and the $H_{t+1}(x)$ are the elevation values of position x at time t and t+1, respectively;

S353, statistically analyzing the difference results of each profile, and calculating the average erosion or deposition rate of each profile, specifically, calculating the average value based on all the difference results to estimate the overall erosion or deposition of the profile line, the calculation formula of erosion or deposition late IS:

$$R(x) = \frac{1}{N-1}\sum_{t=1}^{N-1}\Delta H_{t,t+1}(x),$$

where the R(x) represents the erosion or deposition rate at position x, it is expressed as the average rate of sand amount change in this position within a certain time, and the unit is usually m/year or cm/year; the $\Delta H_{t,t+1}(x)$ is the elevation change of position x between time t and t+1, this means that during two consecutive measurements, the increase or decrease of sand amount or soil elevation at this point is able to be positive (increased sedimentation) or negative (decreased erosion), and the unit is m; N represents the total number of measurement cycles; t represents a predetermined measurement time point, and t and t+1 represent two consecutive measurement periods;

S354, calculating total amount of erosion or deposition of each profile, the total amount is the cumulative sum of elevation changes in all time periods, and is used to reflect the long-term trend and shows the overall elevation changes of the profile from the first measurement to the last measurement; through the above steps, may not only quantify the elevation change between the data of each period, but also systematically analyze and calculate the erosion or deposition rate and total amount of each profile, providing detailed and practical data analysis results for beach erosion monitoring and management, which may help managers and researchers better understand and deal with beach erosion problems.

The S4 specifically includes:

S41, before each period aerial photography data is processed, firstly, determining the reference boundary of the beach, and determining the tidal level during each aerial photography by analyzing the tidal data, so as to set the lowest waterline of each image, the lowest waterline is used as a unified reference boundary to ensure the consistency of all image data in the vertical direction;

S42, setting the coastline as the upper boundary of each period aerial image, and automatically identify and mark the coastline position by using the feature recognition technology in the geographic information system, including analyzing the terrain and vegetation distribution layers, so as to accurately define the coastline position;

S43, according to the profile data defined in S3, gridding the each period aerial images, and dividing each profile area into 12-meter grid units through a preset gridding algorithm to ensure the accurate correspondence and consistency of each grid unit in space;

the technical details of grid processing are as follows:

setting the size and shape of the grid, usually square, which is convenient for calculation and data processing;

coordinating transformation is used to ensure that the coordinate system of the grid is consistent with the image and profile data;

ensuring that each grid contains enough data points for effective data analysis and erosion measurement.

S44, standardizing the gridded data, including normalizing the elevation data to the same standard sea level; Through the above steps, it is able to be ensured that the multi-period aerial photography data are highly consistent and comparable in space before erosion analysis and evaluation, these preparations are an important basis for accurate beach erosion measurement and trend analysis, and provide unified and standardized data input.

The S5 specifically includes:

S51, collecting and sorting out the gridded beach data in S4, including the geographic position, elevation change and topographic information of sand amount of each gridded unit, and all the data are formatted to meet the data input requirements of the deep learning model;

S52, obtaining and integrating additional geographic and meteorological data, including wave intensity, wind speed and direction, tidal data and coastal current dynamics, and obtaining the data in real time from weather stations and ocean research centers to synchronize with beach grid data;

S53, preprocessing all the data to be analyzed, including cleaning, data conversion and feature engineering (extracting or constructing new features that are helpful to the model), it aims to improve the data quality and optimize the learning effect of subsequent models;

S54, applying the preset deep learning network model to train the processed data to identify and predict the patterns and factors affecting beach erosion; by combining the above steps with deep learning technology, the whole method is able to make full use of multi-source data for complex analysis and prediction, thus improving the accuracy of beach erosion monitoring and prediction. In addition, this method is able to automatically identify key influencing factors and enhance the understanding of beach erosion phenomenon, thus providing strong technical support for beach management and protection.

The S54 specifically includes:

S541, firstly, configuring the architecture of the deep learning network model, selecting a network structure suitable for processing geographical and meteorological data, specifically convolutional neural network or cyclic neural network, to process spatial data and time series data, and setting the parameters of each layer of the network, including the number of layers, the number of neurons and the activation function;

S542, dividing the preprocessed data set in S53, according to the proportion of 70% training set, 20% verification set and 10% test set, the training set is used for model training, the verification set is used for adjusting model parameters and preventing over-fitting, and the test set is used for evaluating the final performance of the model;

S543, using the training set to train the deep learning model, specifically applying the back propagation algorithm and gradient descent method to adjust the network weight, minimizing the error between the predicted output and the actual data, and setting the predetermined learning rate and iteration times to achieve the best training effect, the formulas of back propagation and gradient descent are as follows:

$$W_{new} = W_{old} - \alpha \frac{\partial L}{\partial W},$$

where, $W_{new}$ and $W_{old}$ are the weights before and after updating, $\alpha$ is the learning rate, L is the loss function, and $$\frac{\partial L}{\partial W}$$

is the gradient or the loss function about the weight;

S544, monitoring the performance of the model by using the verification set in the training process, and improving the prediction ability of the model for unknown data by adjusting the learning rate and layer number of network parameters, and terminating the training by applying the early stopping, and the training is stopped when the error of the verification set starts to increase to prevent over-fitting;

S545, using the trained model to evaluate the test set data, verifying the accuracy and generalization ability of the model, and identifying the factors that have the greatest impact on beach erosion by analyzing the feature importance of the model output, through the above steps, the deep learning network model is able to effectively learn and identify the key patterns and factors affecting beach erosion from a large number of complex beach and meteorological data, this method provides a powerful tool to analyze and predict beach erosion in a scientific way, thus providing support for beach management and protection strategies.

The S6 specifically includes:

S61, firstly, obtaining a prediction result from S5, including the prediction value of erosion influencing factors of each grid unit, and using the prediction result to reflect the potential influencing factors and intensity of future erosion;

S62, combining the beach data gridded in S4 with the prediction results, and using data fusion technology, integrating the terrain and environmental data of each grid unit with the predicted erosion factors to form a comprehensive data set, so as to provide a more comprehensive perspective for erosion prediction;

S63, using the dynamic system model to analyze and simulate the erosion trend of the integrated data set, wherein the dynamic system model considers the change trend of time series data and the interaction of environmental factors to predict the future erosion mode and rate, and the formula of the dynamic system model is:

$$\frac{dE}{dt} = f(E, I_t),$$

where $$\frac{dE}{dt}$$

represents the change of erosion rate, E is the current erosion state, and $I_t$ is the influencing factor of time t, including various environmental and geographical parameters predicted by S5;

S64, using the calculated erosion rate and pattern, combining with historical erosion data, updating the erosion state of each grid unit, specifically using geographic information system (GIS) technology, spatializing the predicted data, and displaying the future erosion trend and potential danger areas in the form of graphs and maps;

S65, regularly updating the erosion prediction model and simulation parameters, and making adjustments according to the newly obtained real-time monitoring data and environmental changes to ensure the accuracy and adaptability of the model prediction, so that erosion prediction is able to respond to environmental changes and actual observation data.

The S7 specifically includes:

S71, obtaining an erosion rate and predicted future erosion trend of each grid unit from S6, and integrating the rate and trend with historical sand amount data, so as to provide a basis for comparing multi-period beach sand amount;

S72, calculating the sand amount of each grid unit at different time points, and the sand amount of each grid unit is calculated by the following formula:

$$S_t = S_{t-1} + \Delta E_t \times A,$$

where, $S_t$ is the sand amount amount at time t, $S_{t-1}$ is the sand amount amount in the previous time point, $\Delta E_t$ is the erosion rate at the time obtained from S6, and A is the grid area;

S73, comparing the grid sand amount data at different time points, calculating the total erosion of the beach, and getting the total erosion of the whole beach by accumulating the changes of sand amount in all grid units, the calculation formula of the total erosion of the beach is as follows:

$$Total\_rosion = \sum_{i=1}^{N} (S_{start,i} - S_{end,i}),$$

where, Total_rosion is the total amount of beach erosion, in volume (cubic meter), $S_{start,i}$ and $S_{end,i}$ are the sand amount quantity of grid i at the beginning and end of monitoring, and N is the total number of grids;

S74, analyzing the erosion data of each grid unit, identifying the hot spots and areas with less erosion, and using data visualization tools, including heat map and erosion distribution map, to show the spatial distribution characteristics of beach erosion change; through the above steps, the beach erosion process is able to be accurately monitored and analyzed, thus providing detailed data support and scientific basis for beach erosion management and prevention, this method effectively links historical data analysis and future trend prediction, and enhances the scientificity and effectiveness of beach protection measures.

The above is only the specific implementation of this application, but the protection scope of this application is not limited to this, and any person skilled in the art is able to easily think of changes or substitutions within the technical scope disclosed in this application, which should be covered by this application.

What is claimed is:

1. A beach erosion detection and quantitative calculation method based on unmanned aerial vehicle mapping, comprising following steps:

S1, equipping an unmanned aerial vehicle with Light Detection and Ranging (LIDAR), a mapping camera, high-precision inertial navigation and a three-axis platform, combined with latitude and longitude real-time kinematic positioning (RTK) system, and realizing positioning accuracy of plane 1 cm+1 ppm and elevation 1.5 cm+1 ppm;

S2, using the unmanned aerial vehicle configured in the S1 to obtain aerial image data of beaches in different periods, and using point cloud image processing software to denoise the obtained aerial image data and remove interference of non-beach natural elements of vegetation, structures and pedestrians, so as to ensure accuracy and consistency of extracted elevation data;

S3, delineating a plurality of profiles on a beach, extracting elevation data of the profiles from multi-period data by using the aerial image data processed in the S2, and comparing the multi-period data of each profile, so as to analyze an erosion trend and characteristics of the beach;

wherein the S3 specifically comprises:

S31, delineating a plurality of fixed profile lines on the beach by using a geographic information system, wherein the profile lines are arranged at predetermined intervals and directions to cover different geomorphological features and tidal influence areas;

S32, after each scheduled flight mission, according to high-precision aerial image data processed in the S2, automatically aligning and matching to a preset profile line through the geographic information system, so as to ensure accurate alignment of each period image with geographical markers and to provide a solid foundation for historical data comparison;

S33, applying a digital elevation model extraction tool to extract ground elevation data on each profile line from aligned aerial images, and generating a continuous profile elevation map by analyzing a geographical position and a corresponding elevation value of each pixel;

S34, storing and managing multi-period profile elevation data in a preset database, establishing an index for each period of data, and maintaining time sequences and retrievability of the data;

S35, comparing the profile elevation data of each period, performing differential analysis by using a data analysis software, quantifying an elevation change between the profile elevation data of each period, and calculating historical erosion or a deposition rate and total amount of each profile through analysis, so as to reveal a long-term erosion trend;

S36, according to an analysis result of S35, drawing a trend map and an erosion hotspot map to visually show a historical erosion trend and characteristics of each profile, and clearly showing an erosion degree and a changing trend of the beach in a past period of time by color coding and graphic marking;

wherein the S35 specifically comprises:

S351, firstly loading the multi-period profile elevation data stored in the S34 into the data analysis software to ensure all the multi-period profile elevation data are organized and synchronized according to a same profile line and a same time series, so as to provide an accurate data base for subsequent analysis;

S352, comparing the profile elevation data between two consecutive periods by differential analysis technology, and identifying the elevation change by calculating a elevation difference between data points of two adjacent periods, wherein a differential analysis calculation formula is:

$$\Delta H_{t,\, t+1}(x) = H_{t+1}(x) - H_t(x),$$

wherein the $\Delta H_{t,t+1}(x)$ is an elevation variation of position x between time t and t+1, and the $H_t(x)$ and the $H_{t+1}(x)$ are elevation values of position x at time t and t+1, respectively;

S353, statistically analyzing difference results of each profile elevation data, and calculating an average erosion or a deposition rate of each profile elevation data, specifically, calculating an average value based on all the difference results to estimate overall erosion or deposition of the profile line, wherein a calculation formula of erosion or deposition rate is:

$$R(x) = \frac{1}{N-1} \sum_{t=1}^{N-1} \Delta H_{t,t+1}(x),$$

the R(x) represents an erosion or deposition rate at position x; the $\Delta H_{t,t+1}(x)$ is an elevation change of position x between time t and t+1; N represents a total number of measurement cycles; t represents a predetermined measurement time point, and t and t+1 represent two consecutive measurement periods;

S354, calculating a total amount of erosion or deposition of each profile elevation data, wherein the total amount of erosion or deposition is a cumulative sum of elevation changes in all time periods, and is used to reflect the long-term erosion trend and shows overall elevation changes of the profile from a first measurement to a last measurement;

S4, in order to unify a reference boundary of multi-period aerial photography data, defining a unified lowest water line with an upper boundary as a coastline, gridding aerial photography images of each period according to the multi-period data of each profile in the S3, and inputting as standardized data;

S5, combining gridded beach data and additional geographic and meteorological data in the S4, automatically identifying and predicting factors affecting beach erosion, comprising wave intensity, wind speeds and directions, tidal data and coastal current dynamics;

S6, combining a prediction result of a machine learning model in the S5 and the gridded beach data in the S4 to carry out real-time erosion prediction and future erosion trend simulation; and S7, comparing beach sand amount in different periods based on simulation results of the S6, calculating total beach erosion, and comparing sand amount in each grid to get distribution characteristics of beach erosion change.

2. The beach erosion detection and quantitative calculation method based on unmanned aerial vehicle mapping according to claim 1, wherein the S1 specifically comprises:

S11, selecting the unmanned aerial vehicle equipped with the LIDAR, wherein the LIDAR is able to measure a distance between a target and the unmanned aerial vehicle and a relative position of the target by emitting laser pulses and receiving reflected signals, so as to obtain high-resolution terrain data;

S12, configuring the mapping camera on the unmanned aerial vehicle, wherein the mapping camera has a high dynamic range and fast imaging capability, and is used for capturing high-definition images of a ground and providing visual reference for terrain data;

S13, configuring the high-precision inertial navigation system on the unmanned aerial vehicle, monitoring movement states and attitude changes of the unmanned aerial vehicle with an accelerometer and a gyroscope to ensure stability in a flight process, and at a same time, providing a time stamp and spatial position information to support accurate alignment of the LIDAR and camera data;

S14, installing the three-axis platform on the unmanned aerial vehicle, wherein the three-axis platform is used to control angles of the LIDAR and the mapping camera and aim at a measurement area, so as to reduce errors in data acquisition and improve adaptability to complex terrain; and S15, integrating the configured unmanned aerial vehicle with the longitude and latitude RTK system, and using the RTK system for high-precision positioning calibration, wherein the RTK system is able to correct a position of the unmanned aerial vehicle through real-time communication with ground base stations or satellite signals, and realizes the plane positioning accuracy of 1 cm+1 ppm and elevation positioning accuracy of 1.5 cm+1 ppm.

3. The beach erosion detection and quantitative calculation method based on unmanned aerial vehicle mapping according to claim 1, wherein the S2 specifically comprises:

S21, configuring the unmanned aerial vehicle in the S1 to carry out regular flight tasks, and flying to a same beach area at predetermined time intervals to obtain aerial image data in different periods, and ensuring a flight plan is carried out under same weather conditions and sunlight angles, so as to reduce data differences caused by environmental factors;

S22, capturing the aerial image data of the beach with a high-precision mapping camera on the unmanned aerial vehicle, and recording specific parameters of each flight, comprising altitudes, speeds and GPS coordinates, so as to ensure spatial consistency and repeatability of the aerial image data;

S23, firstly subjecting collected image data to preliminary denoising processing, specifically using a filtering technology in an image processing software to remove image blur caused by camera vibration or wind speed change, so as to improve image clarity;

S24, importing processed image data into the point cloud image processing software, and using an automatic classification tool in the point cloud image processing software to identify and label the non-beach natural elements of vegetation, structures and pedestrians in the processed image data, wherein the automatic classification tool is based on machine learning algorithm and accurately distinguishes various elements by analyzing characteristics of colors, textures and shapes of images;

S25, applying a ground point filtering function of the point cloud image processing software to remove data points marked as unnatural beach elements, comprising vegetation and tops of structures, and only keeping real ground elevation points; and S26, performing spatial interpolation on remaining beach natural elevation data to fill data vacancy caused by removing the unnatural beach elements, and specifically using Kriging interpolation method for ensuring consistent and accurate interpolation.

4. The beach erosion detection and quantitative calculation method based on unmanned aerial vehicle mapping according to claim 1, wherein the S4 specifically comprises:

S41, before each aerial photography data is processed, firstly determining a reference boundary of the beach, and determining a tidal level during each aerial photography by analyzing the tidal data, so as to set a lowest waterline of each image, wherein the lowest waterline is used as a unified reference boundary to ensure consistency of all image data in a vertical direction;

S42, setting the coastline as an upper boundary of each period aerial image, and automatically identify and mark a coastline position by using feature recognition technology in the geographic information system, comprising analyzing terrain and vegetation distribution layers, so as to accurately define the coastline position;

S43, according to the profile data defined in the S3, gridding the each period aerial images, and dividing each profile area into 1-2-meter grid units through a preset gridding algorithm to ensure accurate correspondence and consistency of each grid unit in space; and S44, standardizing the gridded beach data, comprising normalizing the elevation data to a same standard sea level.

5. The beach erosion detection and quantitative calculation method based on unmanned aerial vehicle mapping according to claim 1, wherein the S5 specifically comprises:

S51, collecting and sorting out the gridded beach data in the S4, comprising the geographic position, elevation change and topographic information of sand amount of each gridded unit, wherein all the gridded beach data are formatted to meet data input requirements of a preset deep learning network model;

S52, obtaining and integrating additional geographic and meteorological data, comprising wave intensity, wind speeds and directions, tidal data and coastal current dynamics, which are obtained in real time from weather stations and ocean research centers to synchronize with beach grid data;

S53, preprocessing all the data to be analyzed, comprising cleaning, data converting and feature engineering; and S54, applying the preset deep learning network model to train the preprocessed data to identify and predict patterns and factors affecting beach erosion.

6. The beach erosion detection and quantitative calculation method based on unmanned aerial vehicle mapping according to claim 5, wherein the S54 specifically comprises:

S541, firstly configuring an architecture of the preset deep learning network model, selecting a network structure suitable for processing geographical and meteorological data, specifically convolutional neural network or cyclic neural network, to process spatial data and time series data, and setting parameters of each layer of the convolutional neural network or the cyclic neural network, comprising a number of layers, a number of neurons and an activation function;

S542, dividing the preprocessed data set in the S53, according to proportions of 70% training set, 20% verification set and 10% test set, wherein the training set is used for model training, the verification set is used for adjusting model parameters and preventing over-fitting, and the test set is used for evaluating final performance of the preset deep learning network model;

S543, using the training set to train the preset deep learning network model, specifically applying a back propagation algorithm and a gradient descent method to adjust network weight, minimizing an error between a predicted output and actual data, and setting predetermined learning rates and iteration times to achieve best training effects, wherein formulas of the back propagation and gradient descent are:

$$W_{new} = W_{old} - \alpha \frac{\partial L}{\partial W},$$

wherein, $W_{new}$ and $W_{old}$ are weights before and after updating, $\alpha$ is a learning rate, L is a loss function, and $$\frac{\partial L}{\partial W}$$

is a gradient of the loss function about a weight;

S544, monitoring performance of the preset deep learning network model by using the verification set in the training process, and improving prediction abilities of the preset deep learning network model for unknown data by adjusting the learning rate and layer number of network parameters, and terminating the training by applying an early stop technique, and stopping the training when an error of the verification set starts to increase, so as to prevent over-fitting; and S545, using the trained preset deep learning network model to evaluate the test set, verifying accuracy and generalization abilities of the preset deep learning network model, and identifying factors with greatest impacts on beach erosion by analyzing feature importance of model output.

7. The beach erosion detection and quantitative calculation method based on unmanned aerial vehicle mapping according to claim 4, wherein the S6 specifically comprises:

S61, firstly, obtaining a prediction result from the S5, comprising a prediction value of erosion influencing factors of each grid unit, and using the prediction result to reflect potential influencing factors and intensity of future erosion;

S62, combining the gridded beach data in the S4 with the prediction results, and using data fusion technology, integrating terrain and environmental data of each grid unit with the predicted erosion factors to form a comprehensive data set, so as to provide a more comprehensive perspective for erosion prediction;

S63, using a dynamic system model to analyze and simulate the erosion trend of the integrated data set, wherein the dynamic system model considers a change trend of time series data and the interaction of environmental factors to predict a future erosion mode and rate, and a formula of the dynamic system model is:

$$\frac{dE}{dt} = f(E, I_t),$$

wherein $$\frac{dE}{dt}$$

represents the change of erosion rate, E is a current erosion state, and $I_t$ is a influencing factor of time t;

S64, using a calculated erosion rate and pattern, combining with historical erosion data, updating an erosion state of each grid unit, specifically using geographic information system technology, spatializing predicted data, and displaying the future erosion trend and potential danger areas in a form of graphs and maps; and S65, regularly updating an erosion prediction model and simulation parameters, and making adjustments according to newly obtained real-time monitoring data and environmental changes to ensure accuracy and adaptability of the model prediction.

8. The beach erosion detection and quantitative calculation method based on unmanned aerial vehicle mapping according to claim 7, wherein the S7 specifically comprises:

S71, obtaining an erosion rate and a predicted future erosion trend of each grid unit from the S6, and integrating the erosion rate and the predicted future erosion trend with historical sand amount data, so as to provide a basis for comparing multi-period beach sand amount;

S72, calculating the sand amount of each grid unit at different time points, wherein the sand amount of each grid unit is calculated by a following formula:

$$S_t = S_{t-1} + \Delta E_t \times A,$$

wherein $S_t$ is a sand amount at time t, $S_{t-1}$ is a sand amount at a previous time point, $\Delta E_t$ is an erosion rate at a time t obtained from the S6, and A is a grid area;

S73, comparing the grid sand amount data at different time points, calculating total erosion of the beach, and getting the total erosion of the beach by accumulating changes of sand amount in all grid units, wherein a calculation formula of the total erosion of the beach is:

$$\text{Total\_rosion} = \sum_{i=1}^{N-1} (S_{start,i} - S_{end,i}),$$

wherein Total_rosion is the total amount of beach erosion, $S_{start,i}$ and $S_{end,i}$ are sand amount at a beginning and end of monitoring, and N is a total number of grids; and S74, analyzing erosion data of each grid unit, identifying hot spots and areas with less erosion, and using data visualization tools, comprising heat maps and erosion distribution maps, to show spatial distribution characteristics of beach erosion changes.

* * * * *